US012691620B2

(12) United States Patent
Saeki et al.

(10) Patent No.: US 12,691,620 B2
(45) Date of Patent: Jul. 28, 2026

(54) DATASET CREATION METHOD, LEARNING MODEL GENERATION METHOD, NON-TRANSITORY COMPUTER READABLE RECORDING MEDIUM, AND DATASET CREATION DEVICE

(71) Applicant: The Japan Steel Works, Ltd., Tokyo (JP)

(72) Inventors: Akihiko Saeki, Tokyo (JP); Takashi Akagi, Tokyo (JP); Takayuki Hirano, Tokyo (JP)

(73) Assignee: The Japan Steel Works, Ltd., Tokyo (JP)

( * ) Notice: Subject to any disclaimer, the term of this patent is extended or adjusted under 35 U.S.C. 154(b) by 183 days.

(21) Appl. No.: 18/291,483

(22) PCT Filed: Jun. 1, 2022

(86) PCT No.: PCT/JP2022/022281
§ 371 (c)(1),
(2) Date: Jan. 23, 2024

(87) PCT Pub. No.: WO2023/007945
PCT Pub. Date: Feb. 2, 2023

(65) Prior Publication Data
US 2024/0326306 A1     Oct. 3, 2024

(30) Foreign Application Priority Data

Jul. 27, 2021     (JP) ................................. 2021-122631

(51) Int. Cl.
B29C 45/76          (2006.01)
G05B 13/02          (2006.01)
(52) U.S. Cl.
CPC .......... B29C 45/768 (2013.01); B29C 45/766 (2013.01); G05B 13/0265 (2013.01);
(Continued)

(58) Field of Classification Search
CPC ........... B29C 2945/76949; B29C 2945/76976; B29C 2945/76979; G05B 13/0265; G05B 2219/45244
See application file for complete search history.

(56) References Cited

U.S. PATENT DOCUMENTS 5,914,884 A  *  6/1999  Gur Ali ................... B29C 45/76
                                                                700/47
2002/0019674 A1*  2/2002  Liang .................... B29C 45/766
                                                                700/49
(Continued)

FOREIGN PATENT DOCUMENTS

CN          106393622 A      2/2017
JP          S63-209917 A     8/1988
(Continued)

OTHER PUBLICATIONS

Notice of Reasons for Refusal for Japanese Application No. 2021-122631 mailed Jul. 16, 2024, with its machine translation, 10 pages.
(Continued)

*Primary Examiner* — John J DeRusso
(74) *Attorney, Agent, or Firm* — Christian S. Hans; Bret E. Field; Bozicevic, Field & Francis LLP

(57)          ABSTRACT

Physical quantity data indicating the state of a molded product produced by changing a first molding condition parameter set in a molding machine such that the quality of the molded product is degraded or the state of the molding machine is acquired, physical quantity data indicating the state of a molded product produced by changing a second molding condition parameter set in the molding machine or the state of the molding machine is acquired, the second molding condition parameter before change, the physical quantity data obtained at this time, the second molding condition parameter after change, and the physical quantity data obtained when setting the second molding condition
(Continued)

parameter after change are stored in association with each other, and a dataset for machine learning is created by repeating the change of the first and second molding condition parameters and the acquisition of the physical quantity data.

13 Claims, 11 Drawing Sheets

(52) U.S. Cl.
CPC .............. *B29C 2945/76949* (2013.01); *B29C 2945/76976* (2013.01); *B29C 2945/76979* (2013.01); *G05B 2219/45244* (2013.01)

(56) References Cited

U.S. PATENT DOCUMENTS

| | | | | |
|---|---|---|---|---|
| 2004/0089964 A1* | 5/2004 | Yamagiwa | .............. | B29C 45/78 |
| | | | | 264/40.5 |
| 2017/0028593 A1 | 2/2017 | Maruyama | | |
| 2017/0031330 A1 | 2/2017 | Shiraishi et al. | | |
| 2018/0056566 A1* | 3/2018 | Altonen | ................ | B29C 45/766 |
| 2019/0039274 A1 | 2/2019 | Fick et al. | | |
| 2020/0202235 A1 | 6/2020 | Chen et al. | | |
| 2020/0230857 A1 | 7/2020 | Bonada Bo et al. | | |
| 2020/0307055 A1 | 10/2020 | Shimada et al. | | |
| 2021/0001526 A1 | 1/2021 | Hirano et al. | | |
| 2021/0389737 A1* | 12/2021 | Zhao | ...................... | B22D 17/32 |
| 2022/0339837 A1* | 10/2022 | Hirano | ................... | G06N 3/088 |
| 2022/0402183 A1 | 12/2022 | Hirano | | |
| 2024/0042665 A1* | 2/2024 | Yagi | ................... | B29C 45/7653 |

FOREIGN PATENT DOCUMENTS

| | | |
|---|---|---|
| JP | H8-309814 A | 11/1996 |
| JP | 2013-182564 A | 9/2013 |
| JP | 2017-30152 A | 2/2017 |
| JP | 2019-166702 A | 10/2019 |
| JP | 2021-12475 A | 2/2021 |
| JP | 2021-66084 A | 4/2021 |
| KR | 10-2021-0056235 A | 5/2021 |
| WO | WO2021065779 A1 | 4/2021 |

OTHER PUBLICATIONS

English translation of International Search Report for PCT Application No. PCT/JP2022/022281 mailed Jul. 5, 2022, 2 pages.
Extended European Search Report for European Patent Application No. 22849024.9 mailed Jun. 27, 2025, 8 pages.
Office Action for Taiwan Application No. 111123180 mailed Dec. 3, 2025, with its English translation, 52 pages.
First Office Action for Chinese Application No. 202280052315.3 mailed Apr. 24, 2026, with its English translation, 20 pages.

* cited by examiner

FIG.4

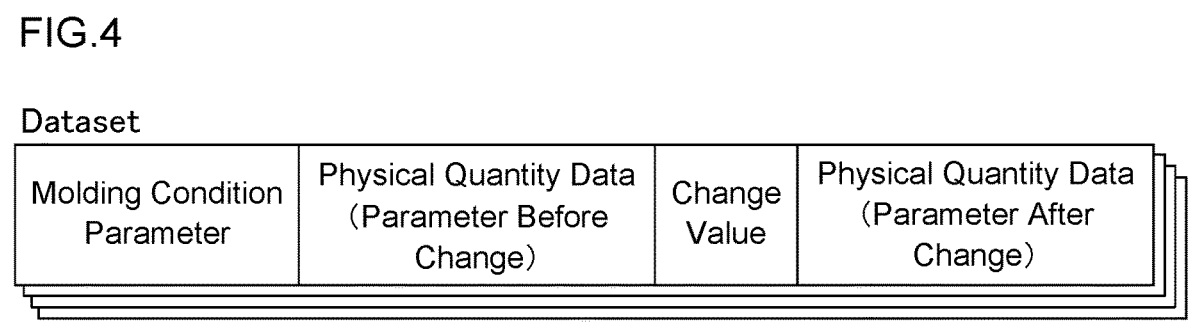

Dataset

| Molding Condition Parameter | Physical Quantity Data (Parameter Before Change) | Change Value | Physical Quantity Data (Parameter After Change) |
|---|---|---|---|

Dataset

FIG.9

Dataset

| Molding Condition Parameter | Physical Quantity Data (Parameter Before Change) | Change Value | Evaluation Value |
|---|---|---|---|

FIG.11

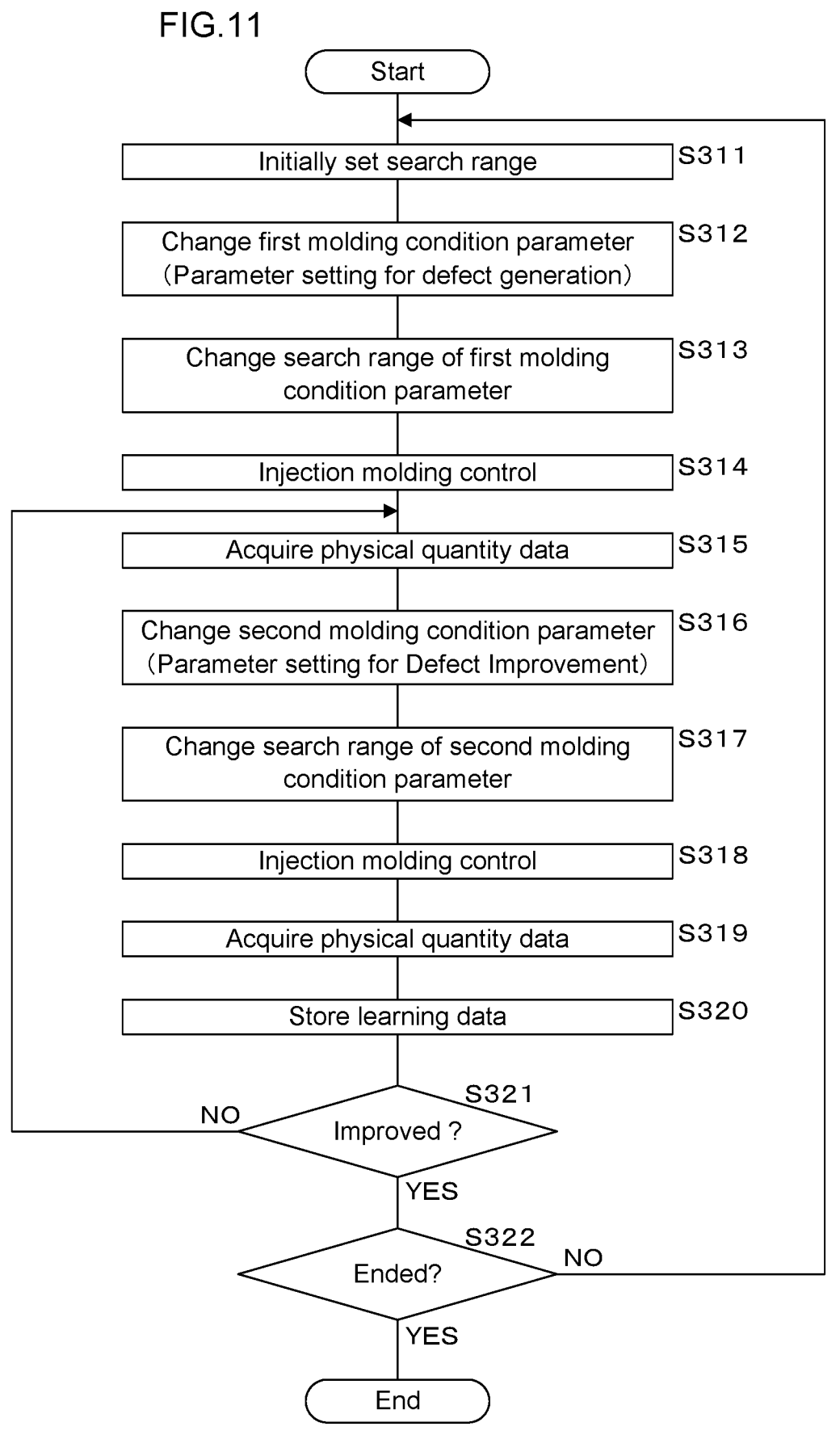

Start

| Initially set search range | S311 |

| Change first molding condition parameter (Parameter setting for defect generation) | S312 |

| Change search range of first molding condition parameter | S313 |

| Injection molding control | S314 |

| Acquire physical quantity data | S315 |

| Change second molding condition parameter (Parameter setting for Defect Improvement) | S316 |

| Change search range of second molding condition parameter | S317 |

| Injection molding control | S318 |

| Acquire physical quantity data | S319 |

| Store learning data | S320 |

S321
Improved ?    NO

YES

S322
Ended?    NO

YES

End

DATASET CREATION METHOD, LEARNING MODEL GENERATION METHOD, NON-TRANSITORY COMPUTER READABLE RECORDING MEDIUM, AND DATASET CREATION DEVICE

CROSS-REFERENCE TO RELATED APPLICATIONS

This application is the national phase under 35 U. S. C. § 371 of PCT International Application No. PCT/JP2022/022281 which has an International filing date of Jun. 1, 2022 and designated the United States of America.

BACKGROUND ART

The present disclosure relates to a dataset creation method, a learning model generation method, a computer program, and a dataset creation device.

There is an injection molding machine system in which a molding condition parameter of an injection molding machine is adjusted by machine learning (for example, Japanese Patent Laid-Open Publication No. 2019-166702).

SUMMARY

However, there is a problem that an excessive amount of time and labor is required to create a dataset for machine learning of a learning model adjusting the molding condition parameter of the molding machine. In order to create the dataset for machine learning, an operator is required to set the state of the molding machine to a state where a molding defect occurs, adjust setting for eliminating the molding defect, and associate and collect data.

An object of the present disclosure is to provide a dataset creation method in which a dataset for machine learning of a learning model adjusting a molding condition parameter set in a molding machine can be automatically created, and a learning model generation method using the automatically created dataset.

Another object of the present disclosure is to provide a computer program and a dataset creation device, in which a dataset for machine learning of a learning model adjusting a molding condition parameter set in a molding machine can be automatically created.

In a dataset creation method according to this aspect, a dataset for machine learning is created by repeating the following processing. In a first molding condition parameter and a second molding condition parameter set in a molding machine, the first molding condition parameter is changed such that the quality of a molded product is degraded. Physical quantity data indicating the state of a molded product produced by the molding machine or the state of the molding machine is acquired. The second molding condition parameter set in the molding machine is changed. The physical quantity data indicating the state of the molded product produced by the molding machine or the state of the molding machine is acquired. The second molding condition parameter before and after change and the physical quantity data are stored in association with each other.

In a learning model generation method according to this aspect, a learning model is subjected to machine learning by using a dataset created by the dataset creation method described above.

In a computer program according to this aspect, a dataset for machine learning is created by allowing a computer to repeatedly execute the following processing. In a first molding condition parameter and a second molding condition parameter set in a molding machine, the first molding condition parameter is changed such that the quality of a molded product is degraded. Physical quantity data indicating the state of a molded product produced by the molding machine or the state of the molding machine is acquired. The second molding condition parameter set in the molding machine is changed. The physical quantity data indicating the state of the molded product produced by the molding machine or the state of the molding machine is acquired. The second molding condition parameter before and after change and the physical quantity data are stored in association with each other.

In a dataset creation device according to this aspect, a dataset for machine learning is created by repeating the following processing. In a first molding condition parameter and a second molding condition parameter set in a molding machine, the first molding condition parameter is changed such that the quality of a molded product is degraded. Physical quantity data indicating the state of a molded product produced by the molding machine or the state of the molding machine is acquired. The second molding condition parameter set in the molding machine is changed. The physical quantity data indicating the state of the molded product produced by the molding machine or the state of the molding machine is acquired. The second molding condition parameter before and after change and the physical quantity data are stored in association with each other.

According to the present disclosure, it is possible to automatically create the dataset for machine learning of the learning model adjusting the molding condition parameter set in the molding machine.

The above and further objects and features will more fully be apparent from the following detailed description with accompanying drawings.

BRIEF DESCRIPTION OF DRAWINGS

FIG. 4 is an explanatory diagram illustrating an example of a dataset according to Embodiment 1.

FIG. 9 is an explanatory diagram illustrating an example of a dataset according to Embodiment 2.

FIG. 11 is a flowchart illustrating a processing procedure of dataset creation according to Embodiment 4.

DESCRIPTION

Specific examples of a dataset creation method, a learning model generation method, a computer program, and a dataset creation device according to embodiments of the present disclosure will be described below with reference to the drawings. At least some of the embodiment described below may be arbitrarily combined. Note that, the present disclosure is not limited to such examples, but is represented by the claims, and is intended to include all changes within the meaning and the range equivalent to the claims.

<Entire Configuration of Injection Molding Machine>

Figure 1:
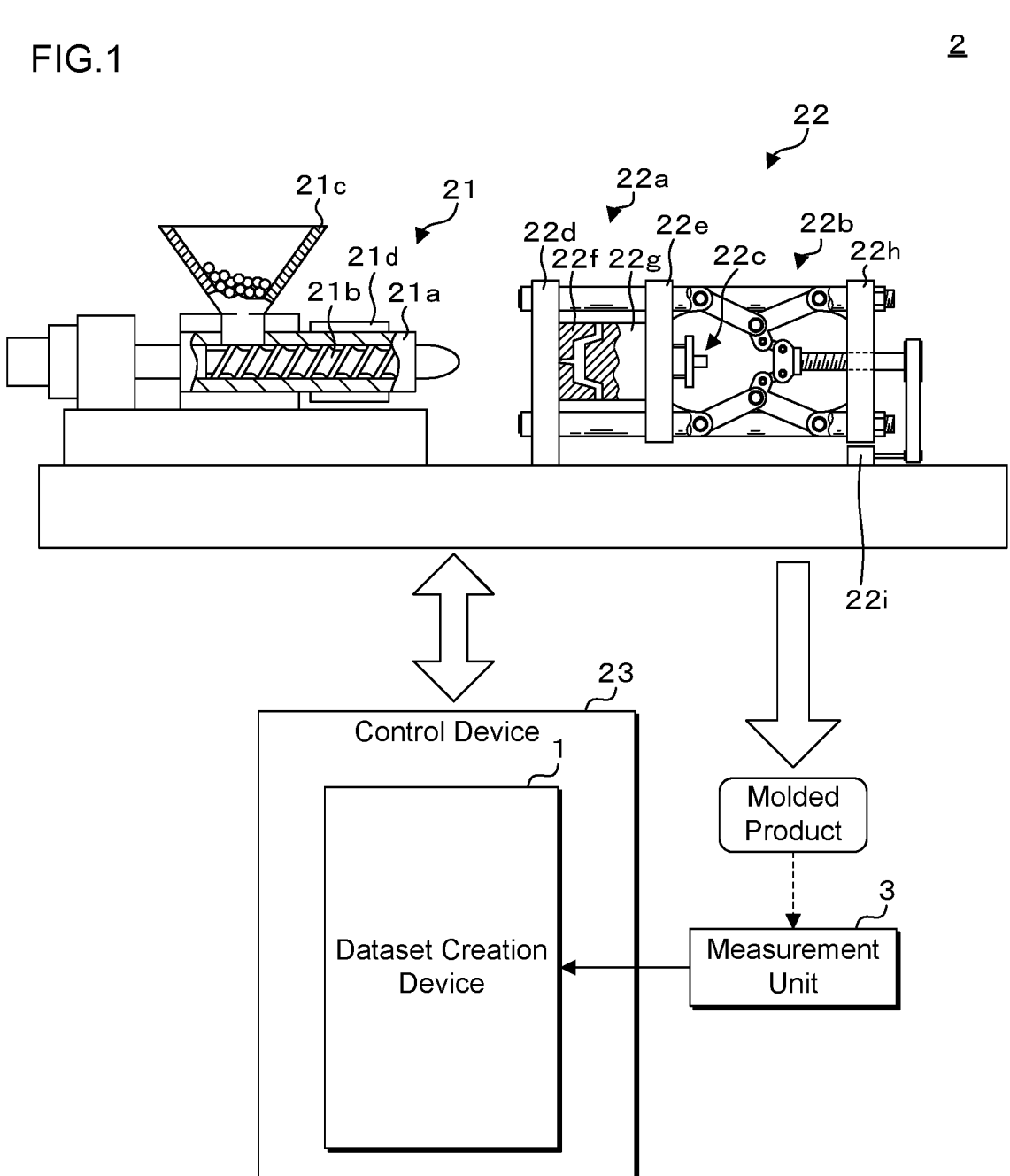
FIG. 1 is a schematic view illustrating a configuration example of an injection molding machine according to Embodiment 1.

FIG. 1 is a schematic view illustrating a configuration example of an injection molding machine 2 according to Embodiment 1. The injection molding machine (molding machine) 2 according to Embodiment 1 includes an injection machine 21, a mold clamping machine 22 disposed in front of the injection machine 21, a control device 23 including a dataset creation device 1 according to Embodiment 1, and a measurement unit 3.

The injection machine 21 includes a heating cylinder 21a including a nozzle in the tip portion, and a screw 21b provided to be drivable in a rotation direction and an axial direction inside the heating cylinder. The injection machine 21 includes a rotation motor driving the screw 21b in the rotation direction, a motor driving the screw 21b in the axial direction, and the like. In the injection machine 21, a hopper 21c for supplying a resin molding material to the heating cylinder 21a, and a heating heater 21d for heating and plasticizing the resin molding material supplied to the heating cylinder 21a are provided.

The mold clamping machine 22 includes a mold machine 22a to which a mold is detachably attached. The mold clamping machine 22 includes a toggle mechanism 22b that opens and closes the mold, and tightens the mold such that the mold is not opened when the mold is filled with the molten molding material injected from the injection machine 21. The mold clamping machine 22 includes a mold clamping driving motor 22i driving the toggle mechanism 22b.

The mold machine 22a includes a fixed platen 22d to which a fixed mold 22f is detachably attached, and similarly, a movable platen 22e to which a movable mold 22g is detachably attached. The toggle mechanism 22b is provided between the movable platen 22e and the mold clamping housing 22h. The toggle mechanism 22b opens and closes the fixed mold 22f and the movable mold 22g by moving the movable platen 22e in a front-back direction (a horizontal direction in FIG. 1) with a driving force of the mold clamping driving motor 22i. When the mold is filled with the molten resin injected from the injection machine 21, the toggle mechanism 22b is capable of tightening the mold such that the fixed mold 22f and the movable mold 22g are not opened. In addition, the mold clamping machine 22 includes an ejector plate 22c in which an ejector pin for taking out a molded product from the mold is provided.

The control device 23 is a device or a circuit controlling the operation of the injection machine 21 and the mold clamping machine 22. The control device 23 according to Embodiment 1 includes the dataset creation device 1. The dataset creation device 1 is a device automatically creating a dataset for machine learning of a learning model 5 (refer to FIG. 6) adjusting a molding condition parameter set in the injection molding machine 2.

In the injection molding machine 2, the molding condition parameter for setting a molding condition is set, and is operated in accordance with the molding condition parameter. The molding condition parameter, for example, includes a resin temperature in the mold, a nozzle temperature, a cylinder heating temperature, a hopper temperature, a mold clamping force, an injection speed, an injection acceleration rate, an injection peak pressure, an injection stroke, and the like. In addition, the molding condition parameter, for example, includes a cylinder tip resin pressure, the seated state of a reverse prevention ring, a holding pressure switching pressure, a holding pressure switching rate, a holding pressure switching position, and a holding pressure completion position. Further, the molding condition parameter, for example, includes a cushion position, a metering back pressure, a metering torque, a metering completion position, a screw retraction rate, a cycle time, a mold closing time, an injection time, a holding pressure time, a metering time, a mold opening time, and the like. The optimal molding condition parameter is changed in accordance with the environment of the injection molding machine 2 and the molded product.

The measurement unit 3 is a device measuring a physical quantity relevant to actual molding when molding is executed by the injection molding machine 2. The measurement unit 3 outputs physical quantity data obtained by measurement processing to the dataset creation device 1.

The physical quantity data obtained by the measurement of the measurement unit 3 includes data relevant to whether the molded product is normal, the type of defect of the molded product, and the degree of defect. The physical quantity data according to the molded product, for example, is a camera image obtained by imaging the molded product, and a deformation amount of the molded product obtained by a laser displacement sensor. The deformation amount is, specifically, the area or the volume of a flash or the area or the volume of a short or sink mark of the molded product. In addition, the physical quantity data according to the molded product may be an optical measurement value such as the chromaticity and the luminance of the molded product obtained by an optical measuring instrument, and data such as the weight of the molded product measured by a weight scale and the strength of the molded product measured by a strength measuring instrument.

<Dataset Creation Device>

Figure 2:
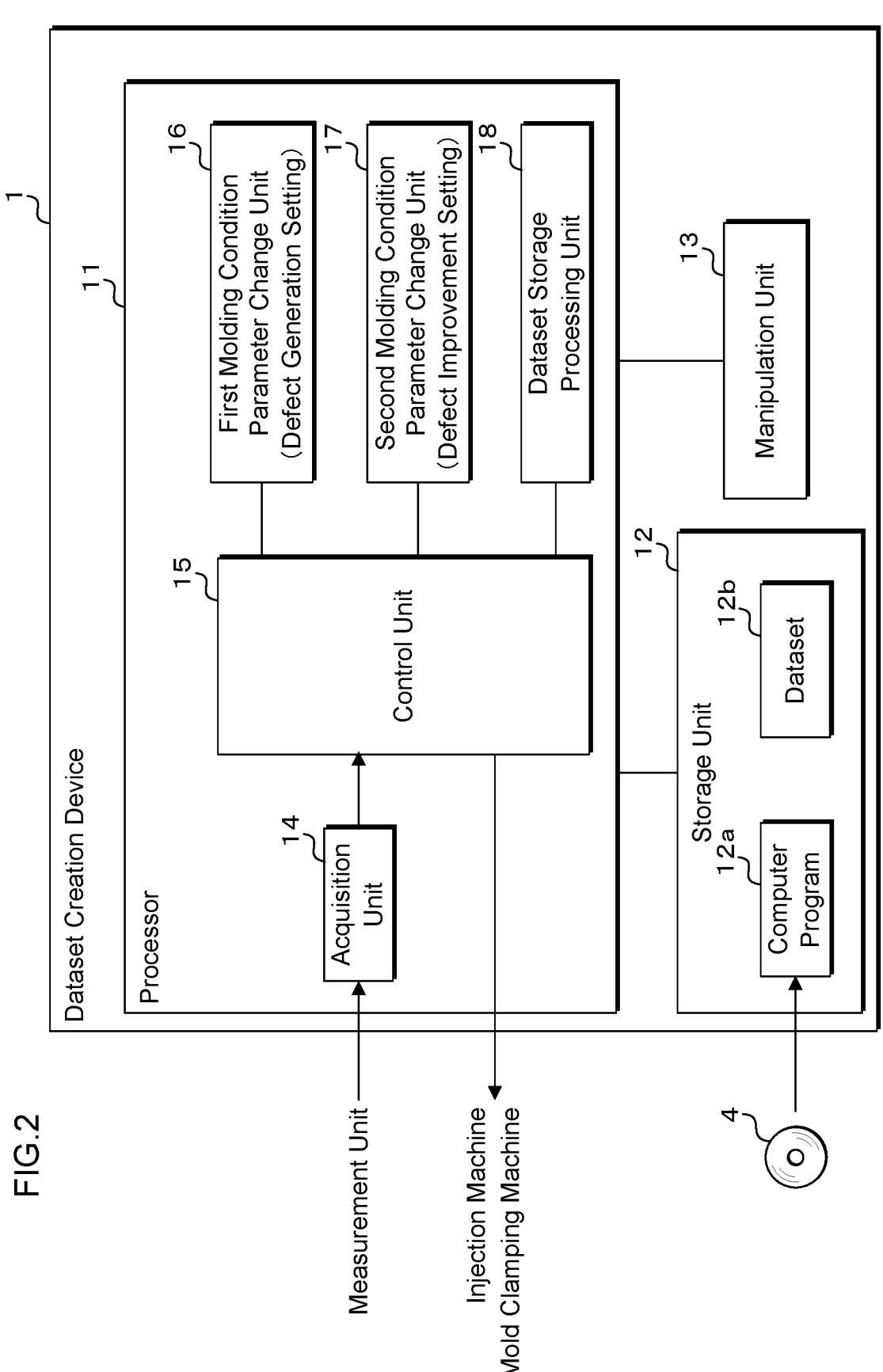
FIG. 2 is a block diagram illustrating a configuration example of a dataset creation device according to Embodiment 1.

FIG. 2 is a block diagram illustrating a configuration example of the dataset creation device 1 according to Embodiment 1. The dataset creation device 1 is a computer, and includes a processor 11, a storage unit (storage) 12, a manipulation unit 13, and the like, as a hardware configuration.

Note that, the dataset creation device 1 may be a server device connected to a network. In addition, the dataset creation device 1 may include a plurality of computers and perform decentralized processing, may be attained by a plurality of virtual machines provided in one server, or may be attained by using a cloud server.

The processor 11 includes an arithmetic circuit such as a central processing unit (CPU), a multi-core CPU, a graphics processing unit (GPU), general-purpose computing on graphics processing units (GPGPU), a tensor processing unit (TPU), an application specific integrated circuit (ASIC), a field-programmable gate array (FPGA), and a neural processing unit (NPU), an internal storage device such as a read only memory (ROM) and a random access memory (RAM), an I/O terminal, and the like.

The processor 11 functions as an acquisition unit 14 and a control unit 15 by executing a computer program (program product) 12a stored in the storage unit 12 described below. In addition, the processor 11 functions as a first molding condition parameter change unit 16, a second molding condition parameter change unit 17, and a dataset storage processing unit 18 by executing the computer program 12a stored in the storage unit 12 described below. Note that, each functional unit of the dataset creation device 1 may be attained by software, or a part or all of the functional units may be attained by hardware.

The storage unit 12 is a non-volatile memory such as a hard disk, an electrically erasable programmable ROM (EEPROM), and a flash memory. The storage unit 12 stores the computer program 12*a* for allowing a computer to execute creation processing of the dataset for machine learning of the learning model 5 adjusting the molding condition parameter.

The computer program 12*a* according to Embodiment 1 may be recorded in a recording medium 4 to be readable by the computer. The storage unit 12 stores the computer program 12*a* read out from the recording medium 4 by a reading device. The recording medium 4 is a semiconductor memory such as a flash memory. In addition, the recording medium 4 may be an optical disk such as a compact disc (CD)-ROM, a digital versatile disc (DVD)-ROM, and a Blu-ray (Registered Trademark) disc (BD). Further, the recording medium 4 may be a magnetic disk such as a flexible disk and a hard disk, a magneto-optical disk, or the like. In addition, the computer program 12*a* according to Embodiment 1 may be downloaded from an external server connected to a communication network, and stored in the storage unit 12.

The manipulation unit 13 is an input device such as a touch panel, a software key, a hardware key, a keyboard, and a mouse.

The acquisition unit 14 acquires the physical quantity data that is measured by the measurement unit 3 when the molding is executed by the injection molding machine 2 in the cycle of a molding step, and output. The acquisition unit 14 outputs the acquired physical quantity data to the control unit 15.

The control unit 15 outputs a control signal based on the set or changed molding condition parameter to the injection machine 21 and the mold clamping machine 22, and controls the operation of the injection molding machine 2.

The first molding condition parameter change unit 16 is a functional unit changing the molding condition parameter such that the defect of the molded product occurs. The molding condition parameter for causing the defect of the molded product is referred to as a first molding condition parameter. The first molding condition parameter, for example, is a parameter for setting the metering value of the molding material and the back pressure of the injection machine 21.

The second molding condition parameter change unit 17 is a functional unit changing the molding condition parameter in order to search for a condition for improving the molding defect in a case where the defect of the molded product occurs. The molding condition parameter to be searchingly changed in order to improve the molding defect is referred to as a second molding condition parameter. The second molding condition parameter, for example, includes the holding pressure switching position, the injection speed, or the holding pressure. Each second molding condition parameter is searchingly changed by the second molding condition parameter change unit 17. Accordingly, change processing of the second molding condition parameter by the second molding condition parameter change unit 17 includes change processing of improving the quality of the molded product, and change processing of degrading the quality of the molded product.

In the cycle of the molding step, the dataset storage processing unit 18 is a functional unit that changes the first and second molding condition parameters, and stores a dataset obtained by associating various data pieces obtained by measuring physical quantitys according to the molded product with each other in the storage unit 12. Specifically, the dataset storage processing unit 18 stores the second molding condition parameter before and after change and the physical quantity data of the molded product obtained before and after the second molding condition parameter is changed in association with each other.

The outline of the cycle of the molding step is as follows, and in the repeated cycle of the molding step, the dataset creation device 1 creates the dataset for machine learning by changing the molding condition parameter. In injection molding, known ejector retraction step, mold closing step, mold clamping step, injection step, holding pressure step, metering step, mold opening step, and ejector advance step are sequentially performed.

<Processing Procedure (Dataset Creation Method)>

Figure 3:
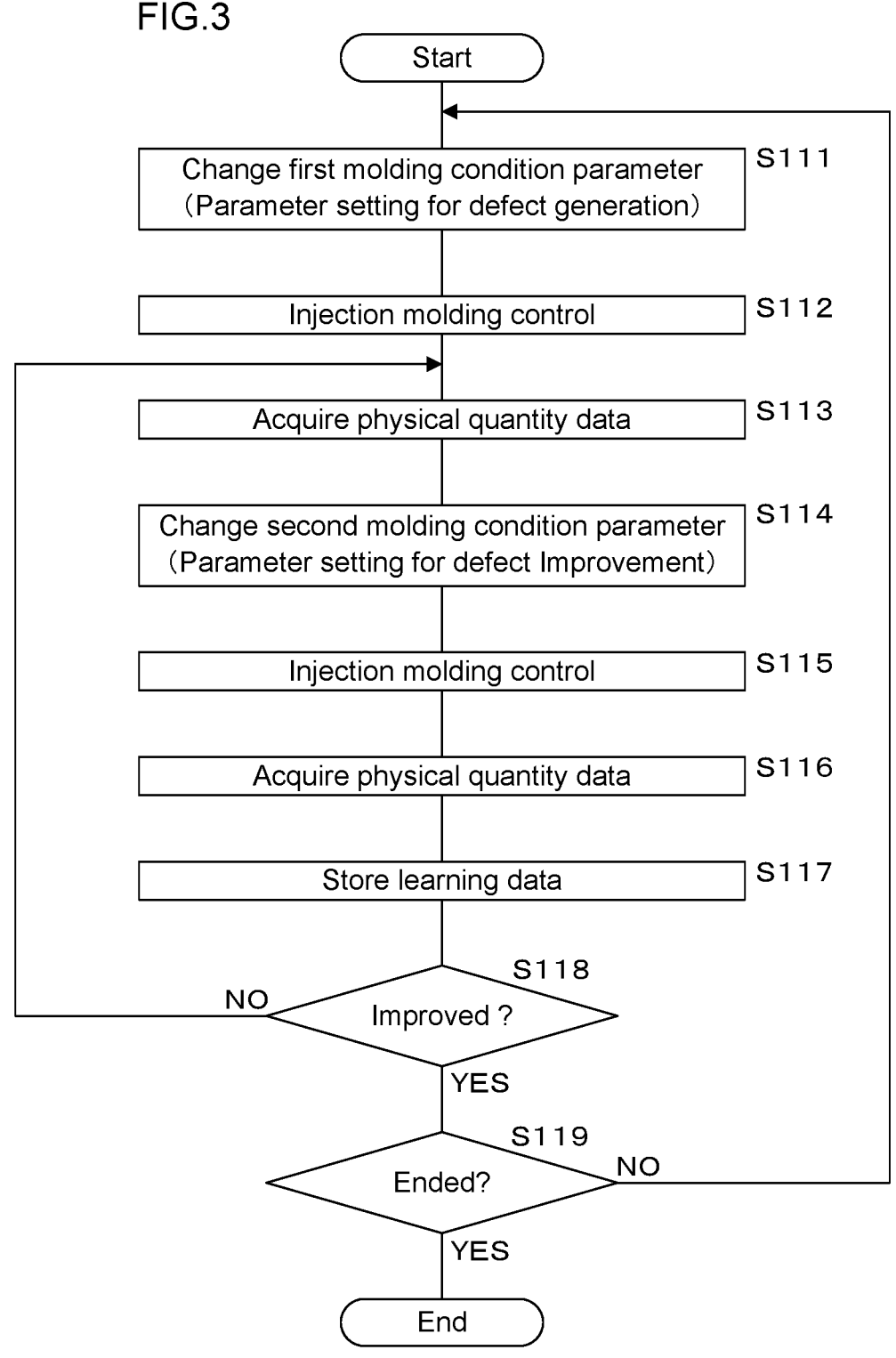
FIG. 3 is a flowchart illustrating a processing procedure of dataset creation according to Embodiment 1.

FIG. 3 is a flowchart illustrating a processing procedure of dataset creation according to Embodiment 1. The processor 11 or the first molding condition parameter change unit 16 changes the first molding condition parameter in the molding condition parameters set in the injection molding machine 2 such that the quality of the molded product is degraded (step S111). The first molding condition parameter, for example, is a parameter for setting the metering value of the molding material and the back pressure of the injection machine 21. The first molding condition parameter is capable of causing the defect of the molded product insofar as the parameter is changed from the normal initial value. That is, in step S111, the state of the injection molding machine 2 is artificially set to a defective state.

The processor 11 or the control unit 15 outputs the changed first molding condition parameter, and the control signal based on the second molding condition parameter and the other molding condition parameter to the injection machine 21 and the mold clamping machine 22, and controls the operation of the injection molding machine 2 (step S112). The injection machine 21 and the mold clamping machine 22 of the injection molding machine 2 perform injection molding processing in accordance with the control signal output from the processor 11.

Then, the measurement unit 3 measures the physical quantity according to the molded product when the injection molding machine 2 executes the molding, and the processor 11 or the acquisition unit 14 acquires the physical quantity data obtained by the measurement of the measurement unit 3 (step S113). The physical quantity data, for example, is data indicating the area or the volume of the flash or the area or the volume of the short of the molded product.

Next, the processor 11 or the second molding condition parameter change unit 17 changes the second molding condition parameter in the molding condition parameters set in the injection molding machine 2 (step S114). The second molding condition parameter is searchingly changed in order to improve the state of the molded product.

A method for changing the second molding condition parameter is not particularly limited. For example, the processor 11 may randomly change the second molding condition parameter. In addition, the processor 11 may change the second molding condition parameter in accordance with a predetermined probability distribution. Further, the second molding condition parameter may be changed by Bayesian optimization using the physical quantity data obtained in the cycle of the molding step before the previous time and the second molding condition parameter.

The processor 11 or the control unit 15 outputs the changed first and second molding condition parameters and the control signal based on the other molding condition parameter to the injection machine 21 and the mold clamping machine 22, and controls the operation of the injection molding machine 2 (step S115). Then, the measurement unit 3 measures the physical quantity according to the molded product when the injection molding machine 2 executes the molding, and as with step S113, the processor 11 or the acquisition unit 14 acquires the physical quantity data obtained by the measurement of the measurement unit 3 (step S116).

The processor 11 or the dataset storage processing unit 18 creates learning data on the basis of the data obtained by the processing of step S112 to step S116, and stores the data in the storage unit 12 (step S117).

FIG. 4 is an explanatory diagram illustrating an example of the dataset according to Embodiment 1. The dataset for machine learning includes a plurality of learning data pieces. The learning data configuring the dataset is data in which the molding condition parameter before the second molding condition parameter is changed, the physical quantity data obtained before and after the second molding condition parameter is changed, and a change value of the second molding condition parameter are associated with each other. The change value may be the second molding condition parameter after change, or may be a change amount of the second molding condition parameter after change with respect to the second molding condition parameter before change. The molding condition parameter before change, which is included in the dataset, includes at least the second molding condition parameter.

Next, the processor 11 determines whether the state of the molded product is improved, on the basis of the physical quantity data acquired in step S116 (step S118). For example, the processor 11 calculates the area or the volume of the flash or the area or the volume of the short, on the basis of the physical quantity data, and determines whether the area or the volume of the flash or the short is less than a predetermined value. In a case where it is determined that the state of the molded product is not improved (step S118: NO), the processor 11 returns the processing to step S113.

In a case where it is determined that the state of the molded product is improved (step S118: YES), the processor 11 determines whether the creation of the dataset is ended (step S119). An end condition is not particularly limited, and in a case where a predetermined amount of dataset is created, a case where the number of times for changing the first molding condition parameter is a threshold value or more, a case where a change range of the first molding condition parameter reaches a predetermined range, or the like may be the end condition. In a case where it is determined that the end condition is satisfied (step S119: YES), the processor 11 ends the processing. In a case where it is determined that the end condition is not satisfied (step S119: NO), the processor 11 returns the processing to step S111, and continues the creation of the dataset.

According to the processing described above, it is possible to automatically create the dataset for machine learning of the learning model 5 for adjusting the molding condition parameter set in the injection molding machine 2.

<Processing Procedure (Learning Model Generation Method)>

Figure 5:
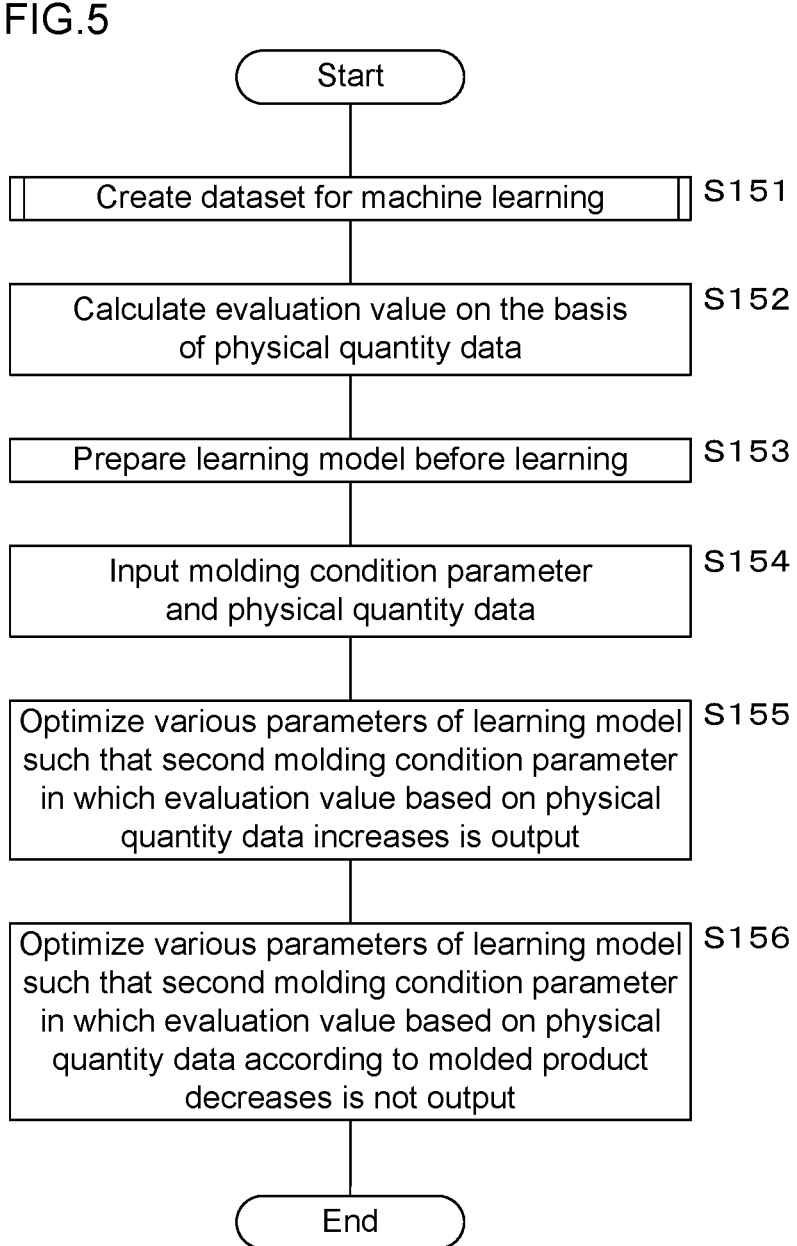
FIG. 5 is a flowchart illustrating a processing procedure of learning model generation according to Embodiment 1.

FIG. 5 is a flowchart illustrating a processing procedure of learning model generation according to Embodiment 1. The processor 11 creates the dataset for machine learning by using the method described using FIG. 3 (step S151). Next, the processor 11 calculates an evaluation value of the molded product on the basis of the physical quantity data obtained after the second molding condition parameter is changed (step S152). The evaluation value may be calculated by using a function or a table in which the evaluation value increases as the area or the volume of the flash or the short is small. The area or the volume of the flash or the short may be directly used as the evaluation value.

Next, the processor 11 prepares the learning model 5 before learning on a memory (step S153).

Figure 6:
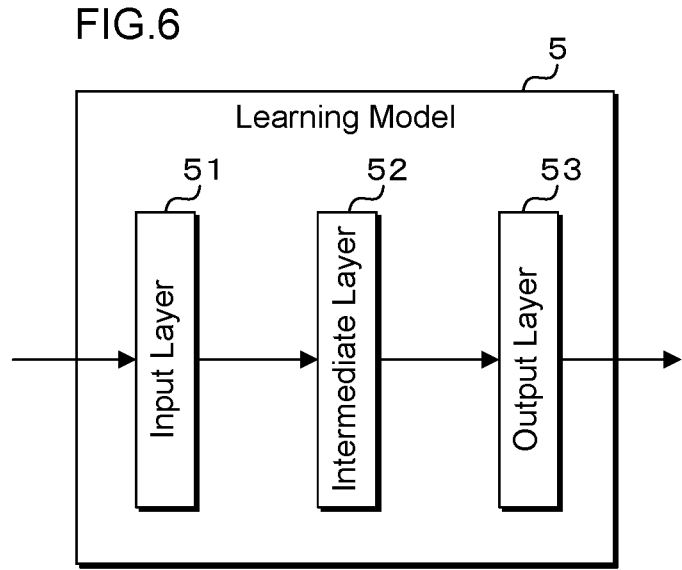
FIG. 6 is an explanatory diagram conceptually illustrating a configuration of a learning model.

FIG. 6 is an explanatory diagram conceptually illustrating the configuration of the learning model 5. The learning model 5 includes an input layer 51, a plurality of intermediate layers 52, and an output layer 53. The input layer 51 includes a plurality of nodes to which the molding condition parameter set in the injection molding machine 2 and the physical quantity data according to the molded product are input.

The plurality of intermediate layers 52 include a plurality of nodes extracting the feature of the physical quantity data input to the input layer 51. In a case where the physical quantity data includes an image, the intermediate layer 52 includes a plurality of convolutional layers and pooling layers.

The output layer 53 includes a plurality of nodes corresponding to a plurality of values of the second molding condition parameter, and outputs a certainty factor that the value is optimal. In addition, the output layer 53 may be configured to include a plurality of nodes corresponding to a plurality of change amounts of the second molding condition parameter, and output a certainty factor that the value is optimal. There may be one type of second molding parameter, or may be a plurality of types of second molding parameters.

In a case where the molding condition parameter and the physical quantity data obtained by measuring the state of the molded product are input, the learning model 5, for example, is a model outputting the second molding condition parameter for improving the state of the molded product or the change amount of the second molding condition parameter. In a case where the physical quantity data is image data, the learning model 5 may be a model including a convolution neural network (CNN) such as ResNet and DenseNet. In a case where observation data is time-series data, the learning model 5 may be a model including a recurrent neural network (RNN), LSTM, a vision transformer, and the like, recognizing the observation data, which is time-series information. In addition, the learning model 5 may be configured by using the learning model 5 having a configuration such as a neural network other than CNN, RNN, and the like, described above, a vision transformer, a support vector machine (SVM), a Bayesian network, or a decision tree such as XGBoost.

Returning to FIG. 5, the processor 11 inputs the molding condition parameter and the physical quantity data (the physical quantity data before the second molding condition parameter is changed) included in the dataset to the input layer 51 of the learning model 5 (step S154). Then, the processor 11 optimizes a weight coefficient of the intermediate layer 52 such that the second molding condition parameter in which the evaluation value based on the physical quantity data according to the molded product increases is output (step S155). The weight coefficient, for example, is a weight (a binding coefficient) between the nodes, or the like. A method for optimizing the weight coefficient is not particularly limited, and for example, various coefficients are optimized by using a gradient descent, a backpropagation, or the like. Similarly, the processor 11 optimizes the weight coefficient of the intermediate layer 52 such that the second molding condition parameter in which the evaluation value based on the physical quantity data according to the molded product decreases is not output (step S156). Note that, for convenience of description, step S155 and step S156 are described as separate processing steps, but the processing pieces are substantially equivalent processing, and the processor 11 simultaneously executes each of the processing pieces.

As described above, it is possible to perform machine learning with respect to the learning model 5 by using the automatically generated dataset for machine learning. Note that, an example has been described in which the processor 11 performs the machine learning of the learning model 5, but the creation of the dataset and the machine learning processing of the learning model 5 may be executed by another computer.

As described above, according to Embodiment 1, it is possible to automatically create the dataset for machine learning of the learning model 5 for adjusting the molding condition parameter set in the injection molding machine 2.

Specifically, the dataset creation device 1 changes the metering value of the molding material or the back pressure as the first molding condition parameter, and thus, is capable of artificially setting a state where the defect of the demolded product may occur and efficiently creating the dataset for machine learning.

In addition, the dataset creation device 1 is capable of creating the dataset for machine learning including the holding pressure switching position, the injection speed, or the holding pressure, as the second molding condition parameter. That is, in order to improve the state of the molded product, it is possible to create the dataset for performing the machine learning with respect to the learning model 5 adjusting the second molding condition parameter.

Further, in order to improve a flash or a short that occurs in the molded product, the dataset creation device 1 is capable of creating the dataset for performing the machine learning with respect to the learning model 5 adjusting the second molding condition parameter.

In addition, the change value included in the dataset includes a change value for improving the quality of the molded product and a change value for further degrading the quality, and thus, it is possible to create the dataset for more efficiently performing the machine learning with respect to the learning model 5 adjusting the second molding condition parameter.

In addition, the second molding condition parameter is changed in accordance with a predetermined probability distribution or changed by Bayesian optimization, and thus, it is possible to rapidly reach the change value of the second molding condition parameter for improving the state of the molded product. Accordingly, it is possible to create the dataset including more change amounts of the second molding condition parameter that is useful to the machine learning for improving the state of the molded product.

In addition, according to the learning model generation method according to Embodiment 1, it is possible to generate the learning model 5 for adjusting the molding condition parameter by using the automatically created dataset.

Modified Example 1

Figure 7:
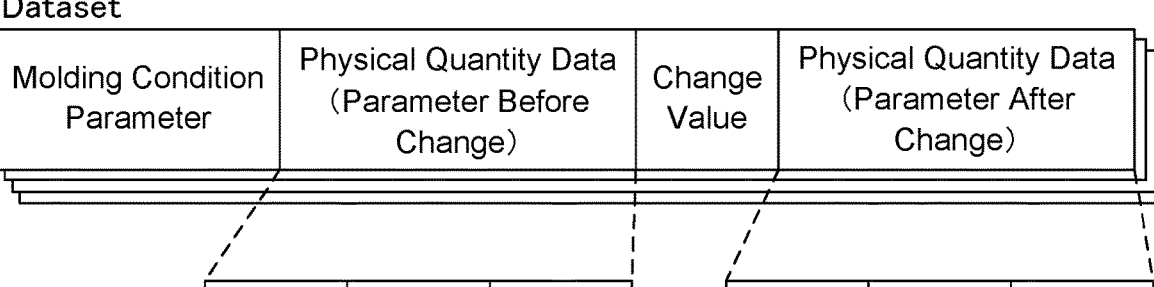
FIG. 7 is an explanatory diagram illustrating an example of a dataset according to a modified example.

FIG. 7 is an explanatory diagram illustrating an example of a dataset according to Modified Example 1. In step S113 and step S116, when acquiring the physical quantity data, the processor 11 may acquire information indicating the portion of the molded product, the area or the volume of a flash, or a short that occurs in the portion. For example, the processor 11 may acquire information indicating a first portion of the molded product, the area or the volume of a flash or a short that occurs in the first portion, information indicating a second portion of the molded product, and the area or the volume of a flash or a short that occurs in the second portion. It is obvious that the area or the volume of a flash or a short in three or more portions of the molded product may be acquired.

According to Modified Example 1, it is possible to create the dataset for machine learning for adjusting the second molding condition parameter for improving the flash or the short in each of a plurality of portions of the molded product.

Modified Example 2

In addition, in Embodiment 1 described above, an example has been described in which the physical quantity data indicating the state of the molded product is acquired by the measurement unit 3 to create the dataset, it may be configured to measure the physical quantity data indicating the state of the injection molding machine 2. In addition, the measurement unit 3 may be configured to acquire both of the physical quantity data indicating the state of the molded product and the physical quantity data indicating the state of the injection molding machine 2.

The measurement unit 3 according to Modified Example 2 is a device measuring any physical quantity relevant to injection molding when the molding is executed by the injection molding machine 2. The measurement unit 3 outputs the physical quantity data obtained by measurement processing to the dataset creation device 1. The physical quantity includes a temperature, a position, a rate, an acceleration rate, a current, a voltage, a pressure, a time, image data, a torque, a force, strain, power consumption, and the like.

Note that, the measurement unit 3 may have a configuration different from that of the injection molding machine 2, or may have a configuration incorporated into the injection machine 21 or the like.

The information measured by the measurement unit 3, for example, includes information indicating the state of the molded product, information indicating the state of the injection molding machine 2, and the like. The information indicating the state of the molded product is the same as that in Embodiment 1 described above.

The information indicating the state of the injection molding machine 2 can be measured by using a thermometer, a pressure gauge, a rate measuring instrument, an acceleration rate measuring instrument, a position sensor, a timer, a weight scale, or the like. The information indicating the state of the injection molding machine 2, for example, includes information such as the resin temperature in the mold, the nozzle temperature, the cylinder temperature, and the hopper temperature. The information indicating the state of the injection molding machine 2, for example, includes information such as the mold clamping force, the injection speed, the injection acceleration rate, the injection peak pressure, the injection stroke, the cylinder tip resin pressure, the seated state of the reverse prevention ring, and the holding pressure switching pressure. The information indicating the state of the injection molding machine 2, for example, includes information such as the holding pressure switching rate, the holding pressure switching position, the holding pressure completion position, the cushion position, the metering back pressure, the metering torque, the metering completion position, the screw retraction rate, the cycle time, the mold closing time, the injection time, the holding pressure time, the metering time, and the mold opening time.

Note that, as information indirectly indicating the state of the injection molding machine 2, information of a peripheral device of the injection molding machine 2, information (a Reynolds number or the like) relevant to the ambient temperature, the ambient humidity, the convection, obtained by using a thermometer, a hygrometer, or a flow instrument, and the like may be included.

Note that, in Embodiment 1 and the modified example described above, the injection molding machine 2 performing resin molding has been described as an example of the molding machine, and the present disclosure may be applied to a hollow molding machine, a film molding machine, an extruder, a twin screw extruder, a spinning extruder, a granulator, and the like. In addition, the molding material is not also limited to the resin, and the present disclosure may be provided to a magnesium injection molding machine and the like.

Embodiment 2

An injection molding machine according to Embodiment 2 is different from that of Embodiment 1 in the creation processing of the dataset and the contents of the dataset. The other configuration of the injection molding machine is the same as that of the injection molding machine according to Embodiment 1, and thus, the same reference numerals will be applied to the same parts, and the detailed description will be omitted.

Figure 8:
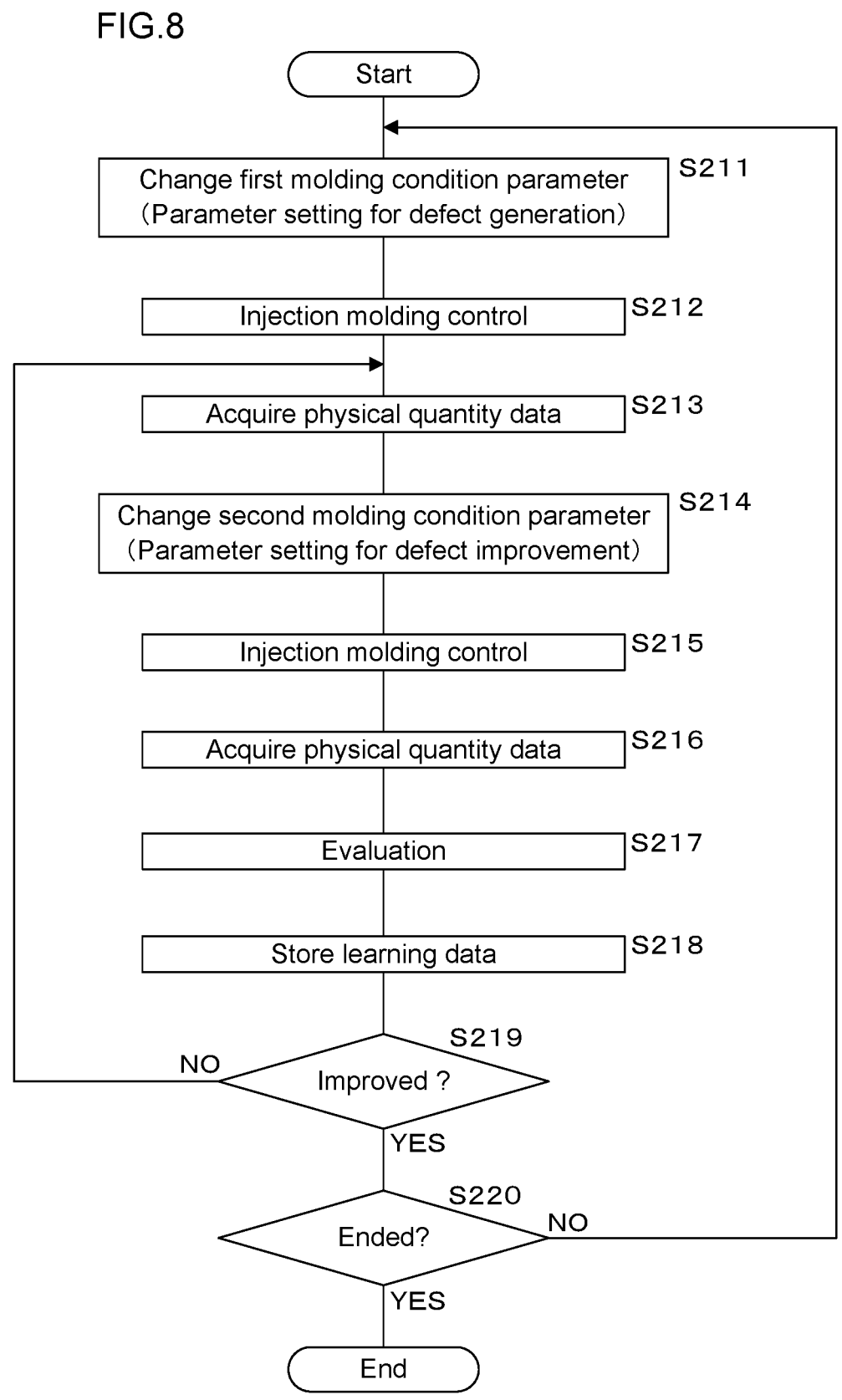
FIG. 8 is a flowchart illustrating a processing procedure of dataset creation according to Embodiment 2.

FIG. 8 is a flowchart illustrating a processing procedure of dataset creation according to Embodiment 2. The processor 11 executes the same processing as that of step S111 to step S116 in Embodiment 1 (step S211 to step S216).

Next, the processor 11 calculates the evaluation value indicating whether the molded product is normal, a defect type (the flash, the short, and the like), and the degree of defect, on the basis of the physical quantity data acquired in step S216 (step S217).

The processor 11 or the dataset storage processing unit 18 creates the learning data, on the basis of the data obtained in the processing of step S212 to step S217, and stores the data in the storage unit 12 (step S217).

Figure 9:
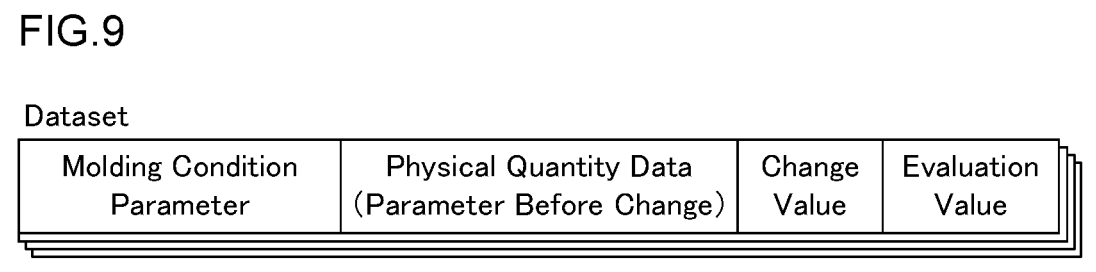

FIG. 9 is an explanatory diagram illustrating an example of the dataset according to Embodiment 2. The dataset for machine learning includes the plurality of learning data pieces. The learning data configuring the dataset is data in which the molding condition parameter before the second molding condition parameter is changed, the physical quantity data obtained before the second molding condition parameter is changed, the change value of the second molding condition parameter, and the evaluation value of the molded product after the second molding condition parameter is changed are associated with each other.

Hereinafter, the processor 11 executes the same processing as that of step S118 to step S119 in Embodiment 1 (step S219 to step S220), and creates and collects the dataset.

As with Embodiment 1, the dataset creation device 1 according to Embodiment 2 is capable of automatically creating the dataset for machine learning of the learning model 5 adjusting the molding condition parameter set in the injection molding machine 2. In particular, the dataset creation device 1 according to Embodiment 2 is capable of creating the dataset including the evaluation value of the molded product.

Embodiment 3

An injection molding machine according to Embodiment 3 is different from that of Embodiment 1 in processing when changing a plurality of molding condition parameters. The other configuration of the injection molding machine is the same as that of the injection molding machine according to Embodiment 1, and thus, the same reference numerals will be applied to the same parts, and the detailed description will be omitted. Note that, a technology according to Embodiment 3 may be applied to Embodiment 2.

When changing a plurality of first molding condition parameters and second molding condition parameters in order to create the dataset, it is necessary to consider the search range of each of the parameters, that is, the upper limit value and the lower limit value of each of the parameters. In a case where the search range of each of the parameters is not considered, there is a concern that a significant problem may occur in the injection molding machine 2. For example, there is a concern that the mold may be broken. In addition, the degree of short is worsened, and there is a concern that the molded product is not capable of being taken out from the mold.

Accordingly, it is desirable that the initial setting of the search range of the first molding condition parameter and the second molding condition parameter is performed in advance by an operator (a person) in consideration of safeness. However, in a case where the search range is independently determined for the setting value of each of the first molding condition parameter and the second molding condition parameter without considering an interaction between the respective parameters, in each search range, safety is further considered. Accordingly, a variation in the degree of molded product to be obtained does not greatly increase.

The dataset creation device 1 according to Embodiment 3 is to solve the problems described above. The dataset creation device 1 according to Embodiment 3 dynamically determines the search range of each of the parameter, in consideration of the interaction in the plurality of first and second molding condition parameters. According to the dynamic determination of the search range, the dataset creation device 1 is capable of extensively changing each of the parameters without causing a significant problem in the injection molding machine 2. Accordingly, it is possible to further increase a variation in the degree of molded product to be obtained. Accordingly, it is possible to obtain the dataset that enables the effective learning of the learning model 5. Hereinafter, the configuration of a dataset device according to Embodiment 3 will be described.

Figure 10:
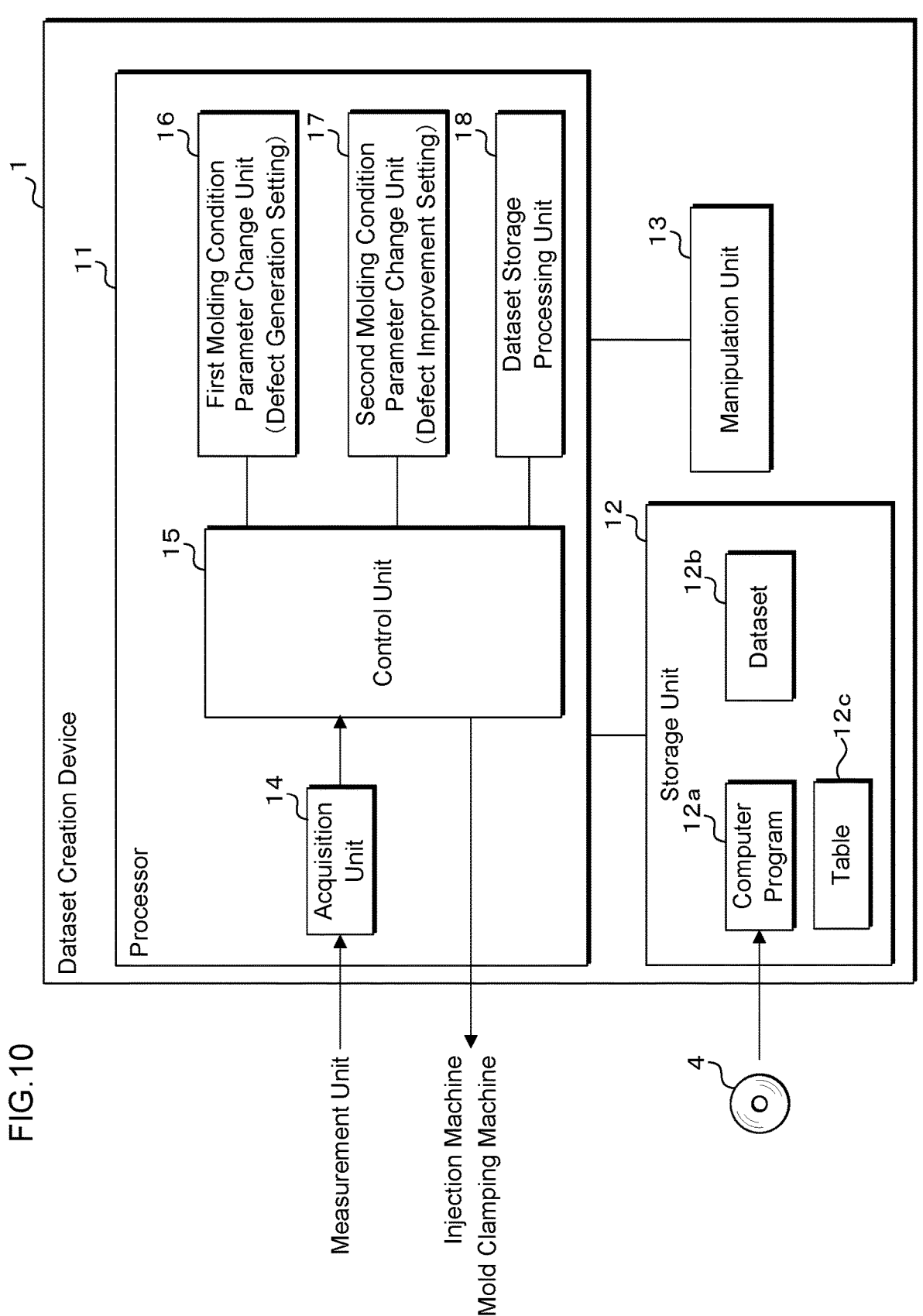
FIG. 10 is a block diagram illustrating a configuration example of a dataset creation device according to Embodiment 3.

FIG. 10 is a block diagram illustrating a configuration example of the dataset creation device 1 according to Embodiment 3. The hardware configuration of the dataset creation device 1 according to Embodiment 3 is the same as that in Embodiment 1. The storage unit 12 according to Embodiment 3 stores a table 12c in which information for dynamically determining the search range in consideration of a correlative relationship in the plurality of first molding condition parameters and second molding condition parameters, within a range not adversely affecting the injection molding machine 2 or the mold, is stored.

For example, the table 12c stores information indicating a correspondence relationship between the value of at least one first molding condition parameter and the upper limit value or the lower limit value of the search range of the other first molding condition parameter. The table 12c may store information indicating a correspondence relationship between the value of the plurality of first molding condition parameters and the upper limit value or the lower limit value of the search range of the plurality of first molding condition parameters.

Similarly, the table 12c stores information indicating a correspondence relationship between the value of at least one second molding condition parameter and the upper limit value or the lower limit value of the search range of the other second molding condition parameter. The table 12c may store information indicating a correspondence relationship between the value of the plurality of second molding condition parameters and the upper limit value or the lower limit value of the search range of the plurality of second molding condition parameters.

In addition, the table 12c may store information indicating a correspondence relationship between the value of one first molding condition parameter and the upper limit value or the lower limit value of the search range of the second molding condition parameter. The table 12c may store information indicating a correspondence relationship between the value of the plurality of first molding condition parameters and second molding condition parameters and the upper limit value or the lower limit value of the search range of the plurality of first molding condition parameters and second molding condition parameters.

FIG. 11 is a flowchart illustrating a processing procedure of dataset creation according to Embodiment 4. The processor 11 initially sets the search range of the first molding condition parameter and the second molding condition parameter, that is, a range in which the value of each of the parameters can be changed (step S311). The operator is capable of inputting the search range of the first molding condition parameter and the second molding condition parameter by manipulating the manipulation unit 13, and the processor 11 receives the search range by the manipulation unit 13.

Next, the processor 11 or the first molding condition parameter change unit 16 changes the first molding condition parameter in the molding condition parameters set in the injection molding machine 2 such that the quality of the molded product is degraded (step S312).

The processor 11 reads out the upper limit value or the lower limit value of the search range of the first molding condition parameter, with reference to the table 12c using the value of the changed first molding condition parameter as a key, and changes the first molding condition parameter (step S313). For example, in a case where a certain first molding condition parameter is changed to the lower limit value of the initially set search range, the upper limit value of the search range of the other first molding condition parameter may be changed to a larger value. In this case, in the next step S312, the first molding condition parameter may be changed beyond the initially set search range.

The processor 11 or the control unit 15 outputs a control signal based on the changed first molding condition parameter, the second molding condition parameter, and the other molding condition parameter to the injection machine 21 and the mold clamping machine 22, and controls the operation of the injection molding machine 2 (step S314).

Then, when molding is executed by the injection molding machine 2, the measurement unit 3 measures the physical quantity according to the molded product, and the processor 11 or the acquisition unit 14 acquires the physical quantity data obtained by the measurement of the measurement unit 3 (step S315).

Next, the processor 11 or the second molding condition parameter change unit 17 changes the second molding condition parameter in the molding condition parameters set in the injection molding machine 2 (step S316).

The processor 11 reads out the upper limit value or the lower limit value of the search range of the second molding condition parameter, with reference to the table 12c using the value of the changed first molding condition parameter and second molding condition parameter as a key, and changes the second molding condition parameter (step S317). In the next step S316, as with the first molding condition parameter, the second molding condition parameter may also be changed beyond the initially set search range.

Note that, the processor 11 may be configured to read out the upper limit value or the lower limit value of the search range of the second molding condition parameter, with reference to the table 12c using the value of the changed second molding condition parameter as a key, and change the second molding condition parameter.

The processor 11 or the control unit 15 outputs a control signal based on the changed first and second molding condition parameters and the other molding condition parameter to the injection machine 21 and the mold clamping machine 22, and controls the operation of the injection molding machine 2 (step S318).

Hereinafter, the same processing as that of step S115 to step S119 according to Embodiment 1 is executed in step S318 to step S322.

According to the processing described above, it is possible to automatically create the dataset for machine learning of the learning model 5 by extensively changing each of the parameters while considering a correlation in the first and second molding condition parameters.

It is possible to greatly vary the state of the molded product, and create the dataset that enables more effective machine learning, compared to the case of changing each of the parameters in the initially set search range without considering the correlation in the first and second molding condition parameters.

On the other hand, in a case where the first and second molding condition parameters are changed without limit by ignoring the search range, there is a concern that the mold or the injection molding machine 2 is broken, but in Embodiment 3, parameter change is performed by using a correlative relationship in each of the parameters recorded in the table 12c. Accordingly, it is possible to create the dataset by changing the parameter extensively, and in some cases, beyond the initially set search range, without adversely affecting the injection molding machine 2 and the mold.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A dataset creation method, comprising:
   (a) changing a first molding condition parameter set in a molding machine such that quality of a molded product is degraded;
   (b) acquiring physical quantity data indicating a state of a molded product produced by the molding machine or a state of the molding machine in which the first molding condition parameter for degrading the quality of the molded product and a second molding condition parameter are set,
   wherein the second molding condition parameter differs from the first molding condition parameter;

(c) changing the second molding condition parameter set in the molding machine;

(d) acquiring the physical quantity data indicating the state of the molded product produced by the molding machine or the state of the molding machine in which the first molding condition parameter and the second molding condition parameter after change are set;

(e) storing the second molding condition parameter before change, the physical quantity data obtained when setting the second molding condition parameter, the second molding condition parameter after change or a change amount in the second molding condition parameter, and the physical quantity data obtained when setting the second molding condition parameter after change or an evaluation value based on the physical quantity data in association with each other; and (f) creating a dataset for machine learning by repeating the change of the first and second molding condition parameters and the acquisition of the physical quantity data, wherein steps (b)-(e) are iterated until the physical quantity data acquired in step (d) demonstrates an improvement in the state of the molded product produced by the molding machine or the state of the molding machine.

2. The dataset creation method according to claim 1, wherein the molding machine is an injection molding machine including a heating cylinder and a screw, which weighs, plasticizes, and injects a molding material, and the first molding condition parameter includes a metering value of a molding material or a back pressure of the molding material.

3. The dataset creation method according to claim 1, wherein the molding machine is an injection molding machine including a heating cylinder and a screw, which weighs, plasticizes, and injects a molding material, and the second molding condition parameter includes a holding pressure switching position, an injection speed, or a holding pressure.

4. The dataset creation method according to claim 1, wherein the molding machine is an injection molding machine, and the physical quantity data includes an area or a volume of a flash or an area or a volume of a short that occurs in the molded product.

5. The dataset creation method according to claim 4, wherein the physical quantity data to be stored includes information indicating a portion of the molded product, and an area or a volume of a flash or an area or a volume of a short that occurs in the portion.

6. The dataset creation method according to claim 1, wherein step of changing the second molding condition parameter includes changing of the second molding condition parameter for improving the quality of the molded product, and changing of the second molding condition parameter for degrading the quality of the molded product.

7. The dataset creation method according to claim 1, wherein step of changing the second molding condition parameter includes randomly changing the second molding condition parameter, changing the second molding condition parameter in accordance with a predetermined probability distribution, or changing the second molding condition parameter on the basis of the physical quantity data obtained before previous repeating process.

8. The dataset creation method according to claim 1, wherein a changeable search range for each of a plurality of first molding condition parameters is initially set, and in processing of changing the first molding condition parameter, when changing one first molding condition parameter, on the basis of a table indicating a correspondence relationship between a value of at least the one first molding condition parameter and an upper limit value or a lower limit value of a search range of the other first molding condition parameter, the initially set search range of the other first molding condition parameter is changed.

9. The dataset creation method according to claim 1, wherein a changeable search range for each of a plurality of second molding condition parameters is initially set, and in processing of changing the second molding condition parameter, when changing one second molding condition parameter, on the basis of a table indicating a correspondence relationship between a value of at least the one second molding condition parameter and an upper limit value or a lower limit value of a search range of the other second molding condition parameter, the initially set search range of the other second molding condition parameter is changed.

10. The dataset creation method according to claim 1, wherein a changeable search range for each of a plurality of first molding condition parameters and second molding condition parameters is initially set, in step of changing the first molding condition parameter, when changing one first molding condition parameter, on the basis of a table indicating a correspondence relationship between a value of at least the one first molding condition parameter and an upper limit value or a lower limit value of a search range of the other first molding condition parameter, the initially set search range of the other first molding condition parameter is changed, and in step of changing the second molding condition parameter, when changing one first molding condition parameter and one second molding condition parameter, on the basis of a table indicating a correspondence relationship between a value of at least the one first molding condition parameter and the one second molding condition parameter and an upper limit value or a lower limit value of a search range of the second molding condition parameter other than the one first molding condition parameter and the one second molding condition parameter, the initially set search range of the other second molding condition parameter is changed.

11. A learning model generation method for adjusting a molding condition parameter of a molding machine, the method comprising:

creating a dataset on the basis of the dataset creation method according to claim 1; and generating a learning model by machine learning based on the created dataset, the learning model outputting a second molding condition parameter after change or a change amount in the second molding condition parameter in which an evaluation value based on physical quantity data obtained when setting the second molding condition parameter increases, when at least the second molding condition parameter before change and the physical quantity data are input.

12. A non-transitory computer readable recording medium storing a computer program for creating a dataset for machine learning by allowing a computer to repeatedly execute processing of:

(a) changing a first molding condition parameter set in a molding machine such that quality of a molded product is degraded;

(b) acquiring physical quantity data indicating a state of a molded product produced by the molding machine or a state of the molding machine in which the first molding condition parameter for degrading the quality of the molded product and a second molding condition parameter are set, wherein the second molding condition parameter differs from the first molding condition parameter;

(c) changing the second molding condition parameter set in the molding machine;

(d) acquiring the physical quantity data indicating the state of the molded product produced by the molding machine in which the first molding condition parameter or the state of the molding machine and the second molding condition parameter after change are set; and (e) storing the second molding condition parameter before change, the physical quantity data obtained when setting the second molding condition parameter, the second molding condition parameter after change or a change amount in the second molding condition parameter, and the physical quantity data obtained when setting the second molding condition parameter after change or an evaluation value based on the physical quantity data in association with each other, wherein steps (b)-(e) are iterated until the physical quantity data acquired in step (d) demonstrates an improvement in the state of the molded product produced by the molding machine or the state of the molding machine.

13. A dataset creation device, comprising a processor executing processing of creating a dataset for machine learning of a learning model for adjusting a molding condition parameter set in a molding machine, wherein the processor executes processing of:

(a) changing a first molding condition parameter set in a molding machine such that quality of a molded product is degraded;

(b) acquiring physical quantity data indicating a state of a molded product produced by the molding machine or a state of the molding machine in which the first molding condition parameter for degrading the quality of the molded product and a second molding condition parameter are set, wherein the second molding condition parameter differs from the first molding condition parameter;

(c) changing the second molding condition parameter set in the molding machine;

(d) acquiring the physical quantity data indicating the state of the molded product produced by the molding machine or the state of the molding machine in which the first molding condition parameter and the second molding condition parameter after change are set;

(e) storing the second molding condition parameter before change, the physical quantity data obtained when setting the second molding condition parameter, the second molding condition parameter after change or a change amount in the second molding condition parameter, and the physical quantity data obtained when setting the second molding condition parameter after change or an evaluation value based on the physical quantity data in association with each other in a storage unit; and (f) creating a dataset for machine learning by repeating the change of the first and second molding condition parameters and the acquisition of the physical quantity data, wherein steps (b)-(e) are iterated until the physical quantity data acquired in step (d) demonstrates an improvement in the state of the molded product produced by the molding machine or the state of the molding machine.

* * * * *